US009491360B2

(12) United States Patent
Schulze et al.

(10) Patent No.: US 9,491,360 B2
(45) Date of Patent: Nov. 8, 2016

(54) REFERENCE FRAME SELECTION FOR STILL IMAGE STABILIZATION

(71) Applicant: Apple Inc., Cupertino, CA (US)

(72) Inventors: Anita Nariani Schulze, Los Altos, CA (US); Rolf Toft, Palo Alto, CA (US); Paul M. Hubel, Mountain View, CA (US); Marius Tico, Mountain View, CA (US); Jianping Zhou, Fremont, CA (US); Ralph Brunner, Cupertino, CA (US); Claus Molgaard, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 45 days.

(21) Appl. No.: 13/911,873

(22) Filed: Jun. 6, 2013

(65) Prior Publication Data
US 2014/0362256 A1    Dec. 11, 2014

(51) Int. Cl.
H04N 5/232    (2006.01)
(52) U.S. Cl.
CPC ................................ H04N 5/23277 (2013.01)
(58) Field of Classification Search
None
See application file for complete search history.

(56) References Cited

U.S. PATENT DOCUMENTS

| | | | |
|---|---|---|---|
| 5,646,521 A | 7/1997 | Rosenthal | |
| 5,920,657 A | 7/1999 | Bender | |
| 6,271,847 B1 | 8/2001 | Shum | |
| 6,301,440 B1 | 10/2001 | Bolle | |
| 6,552,744 B2 | 4/2003 | Chen | |
| 7,130,864 B2 | 10/2006 | Lin | |
| 7,424,218 B2 | 9/2008 | Baudisch | |
| 7,602,418 B2 | 10/2009 | Border | |
| 7,639,741 B1 | 12/2009 | Holt | |
| 7,688,379 B2 * | 3/2010 | Forman | H04N 5/23212 348/353 |
| 7,742,083 B2 | 6/2010 | Fredlund | |
| 7,839,429 B2 | 11/2010 | Williams | |

(Continued)

FOREIGN PATENT DOCUMENTS

WO    0013407    1/2000

OTHER PUBLICATIONS

Madiha Hussain Malik, et al.: "Wavelet Based Exposure Fusion," Lecture Notes in Engineering and Computer Science, Jul. 2, 2008, pp. 688-693, XP055132823, Retrieved from the Internet: URL: http://www.iaeng.org/publication/WCE2008/WCE2008_pp688-693.pdf [retrieved on Jul. 31, 2014].

(Continued)

Primary Examiner — Siamak Harandi
Assistant Examiner — Pinalben Patel
(74) Attorney, Agent, or Firm — Blank Rome LLP

(57) ABSTRACT

Systems, methods, and computer readable media to improve image stabilization operations are described. A novel combination of image quality and commonality metrics are used to identify a reference frame from a set of commonly captured images which, when the set's other images are combined with it, results in a quality stabilized image. The disclosed image quality and commonality metrics may also be used to optimize the use of a limited amount of image buffer memory during image capture sequences that return more images that the memory may accommodate at one time. Image quality and commonality metrics may also be used to effect the combination of multiple relatively long-exposure images which, when combined with a one or more final (relatively) short-exposure images, yields images exhibiting motion-induced blurring in interesting and visually pleasing ways.

20 Claims, 12 Drawing Sheets

(56) References Cited

U.S. PATENT DOCUMENTS

| | | |
|---|---|---|
| 7,856,120 B2 | 12/2010 | Porikli |
| 7,929,853 B2 | 4/2011 | Park |
| 7,991,196 B2 | 8/2011 | Tener |
| 8,018,999 B2 | 9/2011 | Yao |
| 8,023,000 B2 | 9/2011 | Tamaru |
| 8,189,051 B2 | 5/2012 | Shih |
| 8,335,400 B2 | 12/2012 | Kobayashi |
| 8,699,822 B2 | 4/2014 | Park |
| 2003/0184778 A1 | 10/2003 | Chiba |
| 2005/0228849 A1 | 10/2005 | Zhang |
| 2006/0210166 A1 | 9/2006 | Takemoto |
| 2006/0257048 A1* | 11/2006 | Lin .................... G06K 9/00711 382/276 |
| 2007/0182861 A1 | 8/2007 | Luo |
| 2007/0222864 A1 | 9/2007 | Hiraga |
| 2008/0037869 A1 | 2/2008 | Zhou |
| 2008/0166115 A1 | 7/2008 | Sachs |
| 2008/0170126 A1 | 7/2008 | Tico |
| 2008/0192129 A1 | 8/2008 | Walker |
| 2009/0115859 A1 | 5/2009 | Lee |
| 2009/0161982 A1 | 6/2009 | Tico |
| 2009/0169102 A1 | 7/2009 | Zhang |
| 2009/0263028 A1* | 10/2009 | Kwon .................... G06K 9/036 382/224 |
| 2010/0017115 A1 | 1/2010 | Gautama |
| 2010/0020224 A1 | 1/2010 | Hattori |
| 2010/0053346 A1 | 3/2010 | Mitsunaga |
| 2010/0165122 A1* | 7/2010 | Castorina et al. ......... 348/208.4 |
| 2010/0183225 A1 | 7/2010 | Vantaram |
| 2010/0231593 A1 | 9/2010 | Zhou |
| 2010/0271512 A1 | 10/2010 | Garten |
| 2010/0277609 A1 | 11/2010 | Abe |
| 2011/0038548 A1 | 2/2011 | Rezazadeh |
| 2011/0311147 A1 | 12/2011 | Pahalawatta |
| 2012/0069203 A1 | 3/2012 | Voss |
| 2012/0076427 A1 | 3/2012 | Hibino |
| 2012/0082389 A1 | 4/2012 | Sakamoto |
| 2012/0086829 A1* | 4/2012 | Hohjoh .................... H04N 5/772 348/223.1 |
| 2012/0120283 A1* | 5/2012 | Capata ................ G06K 9/00255 348/241 |
| 2012/0121202 A1* | 5/2012 | Wang et al. .................... 382/255 |
| 2012/0154579 A1 | 6/2012 | Hampapur |
| 2012/0183202 A1 | 7/2012 | Wei |
| 2012/0201427 A1 | 8/2012 | Jasinski |
| 2012/0218427 A1 | 8/2012 | Wu |
| 2012/0249826 A1 | 10/2012 | Kobayashi |
| 2012/0281924 A1 | 11/2012 | Coulombe |
| 2012/0281969 A1 | 11/2012 | Jiang |
| 2012/0293607 A1 | 11/2012 | Bhogal |
| 2012/0300023 A1 | 11/2012 | Lee |
| 2012/0306999 A1 | 12/2012 | Zhou |
| 2013/0028509 A1 | 1/2013 | Moon |
| 2013/0044230 A1 | 2/2013 | Zhou |
| 2013/0148860 A1 | 6/2013 | Musatenko |
| 2013/0208997 A1 | 8/2013 | Liu |
| 2013/0265451 A1 | 10/2013 | Son |
| 2014/0071299 A1 | 3/2014 | Grundmann |
| 2014/0363087 A1 | 12/2014 | Tico |
| 2016/0063343 A1* | 3/2016 | Loui .................... G06K 9/4604 382/195 |

OTHER PUBLICATIONS

Tico, M. et al.: "Robust Method of Digital Image Stabilization," 3rd International Symposium on Communications, Control and Signal Processing, 2008. ISCCSP 2008, IEEE, Piscataway, NJ, USA, Mar. 12, 2008, pp. 316-321, XP031269886, ISBN: 978-1-244-1687-5.

Luo, Yiwen, and Xiaoou Tang, "Photo and video quality evaluation: Focusing on the subject." Computer Vision-ECCV 2008. Springer Berlin Heidelberg, 2008, 386-399.

Yousefi, Siamak, M. Rahman, and Nasser Kehtarnavaz, "A new auto-focus sharpness function for digital and smart-phone cameras." Consumer Electronics, IEEE Transactions on 57.3 (2011): 1003-1009.

\* cited by examiner

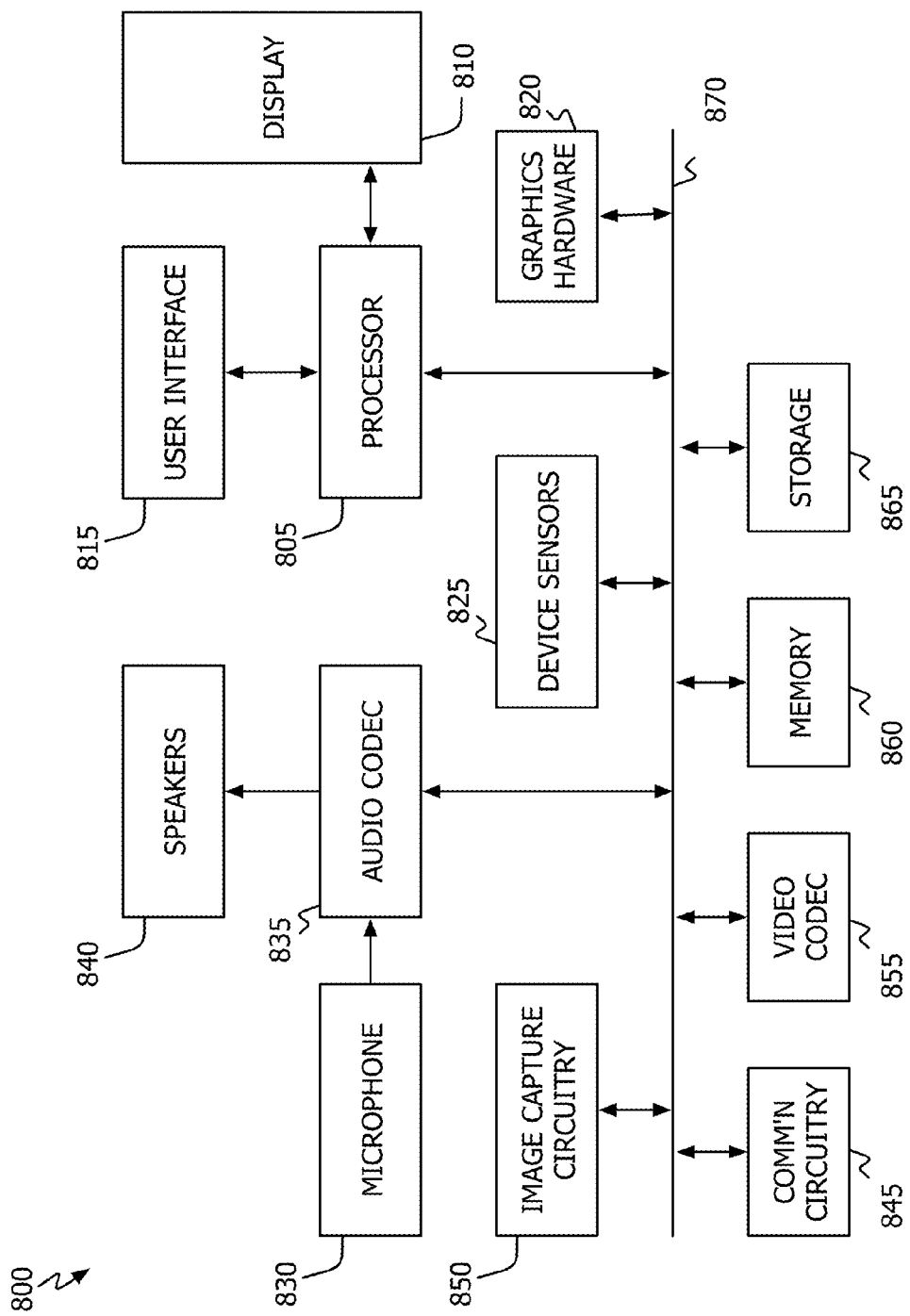

REFERENCE FRAME SELECTION FOR STILL IMAGE STABILIZATION

BACKGROUND

This disclosure relates generally to the field of digital photography. More particularly, but not by way of limitation, this disclosure relates to still image stabilization techniques. As used herein, image stabilization refers to a collection of techniques for reducing motion-induced blurring during image capture operations. Such motion may result from the movement of the camera, objects in the scene, or both.

Taking high quality photographs in low ambient light conditions, or photographing dynamic scenes (e.g., sport scenes) is challenging due to camera motion and/or the motion of objects within a scene during image capture. One way to reduce motion blur without amplifying an image's noise is to capture and fuse multiple short exposed images of the scene. Such operations are often called 'Still Image Stabilization.' While shortening image exposure times can reduce motion blur artifacts, it does so at the expense of a noisier and/or darker image.

A common approach to image stabilization consists of (1) selecting a reference image from a set of multiple short exposed images, (2) globally registering all non-reference images with the reference image, and (3) synthesizing an output image by fusing all captured images to the reference image. In this way the output image represents the scene as it was at the time the reference image was captured, where non-reference images are used to reduce the noise in the reference image by averaging/merging multiple observations of each reference pixel across all images. A common approach to selecting the reference image is based on a quality criterion that is evaluated for each image independently (e.g., image sharpness). Such an approach can be insufficient because is does not account for, or consider, scene dynamics. For example, when capturing a dynamic scene various objects may have different relative positions in the different short exposure images. Selecting the reference image independent of the other images can result in a situation where the positions of the objects in the reference image are very different from their positions in the other images. In these situations, the image regions occupied by such objects in the reference frame cannot be improved because they have no corresponding counterparts in the other frames. Thus, it would be beneficial to provide a means to select a reference image so as to improve image stabilization operations.

SUMMARY

In one embodiment the inventive concept provides a method to identify and combine multiple short-exposure images. The method includes obtaining a (temporal) sequence of images of a scene, and determining quality metric (e.g., sharpness) and commonality metric (e.g., a measure of similarity) values for each image. Using a combination of the quality metric and commonality metric values, a reference image may then be identified, whereafter at least some of the sequence of images (other than the reference image) may be combined with the reference image to produce an output image. Motion information such as that available from an accelerometer or gyro sensor may also be used when evaluating an image's quality based on motion blur. Conceptually, a commonality measure may be used to indicate how various objects in two images are in the same place. In some embodiments the reference image may be selected from obtained images, while in other embodiments motion and/or quality metric values may be used to eliminate some from consideration.

In another embodiment, the inventive concept provides a method that captures some motion related effects in an image. A method in accordance with this approach includes obtaining a first sequence of images, each of which was captured using a relatively long exposure-time. The first sequence may be terminated with the capture of one or more images, short-exposure images (relative to those in the first sequence). At least some of the first sequence of images may, after a reference image is identified, be combined to form an intermediate image. One or more of the short-exposure images may then be combined with the intermediate image to produce and output image (edge information from the one or more short-exposure images and surface or texture information from the long-exposure images). The methodologies alluded to above may be employed to identify and select the most appropriate images from each of the long- and short-exposure images.

In still another embodiment, use of image buffer memory during capture operations may be optimized using the quality metric and commonality metric measures described herein. Some methods in accordance with this approach include obtaining and storing a (temporal) sequence 'N' images, followed immediately by a next-in-time image. In one embodiment motion information for the next-in-time image may be used as an initial check—rejecting all such images from further processing if the image is judged (based on the image's motion information) to be too blurry. Assuming the next-in-time image is not rejected at this stage, quality metric and commonality metric values for each image may be obtained. If the next-in-time image is determined to be a "better" image than one of the N images already stored in memory—based on a (weighted) combination of quality metric and commonality metric values—the next-in-time image can replace it. This process may be repeated as many times as desired. In one embodiment, the next-in-time image may be compared only to those images stored in memory that were captured within a specified time period relative to itself.

In one embodiment, each of the above described methods, and variation thereof, may be implemented as a series of computer executable instructions. Such instructions may use any one or more convenient programming language. Such instructions may be collected into modules and/or programs and stored in any media that is readable and executable by a computer system or other programmable control device.

BRIEF DESCRIPTION OF THE DRAWINGS

FIG. 8 shows, in block diagram form, a multi-function electronic device in accordance with one embodiment.

DETAILED DESCRIPTION

This disclosure pertains to systems, methods, and computer readable media to improve image stabilization operations. In one embodiment, a novel combination of image quality and commonality metrics may be used to identify a reference frame from a set of commonly captured images which, when the set's other images are combined with it, results in a quality stabilized image. In another embodiment, the disclosed image quality and commonality metrics may be used to optimize the use of image buffer memory. Embodiments of this type optimize use of a limited amount of image buffer memory during image capture sequences that return more images that the memory may accommodate at one time. In still another embodiment, image quality and commonality metrics may be used to effect the combination of multiple relatively long-exposure images which, when combined with a one or more final (relatively) short-exposure images, yields images exhibiting motion-induced blurring in interesting and visually pleasing ways. In accordance with this approach, the sharper edges of the short exposure images may be fused/blended with the lower noise surfaces of the longer exposure images.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design an implementation of image stabilization systems having the benefit of this disclosure.

Figure 1:
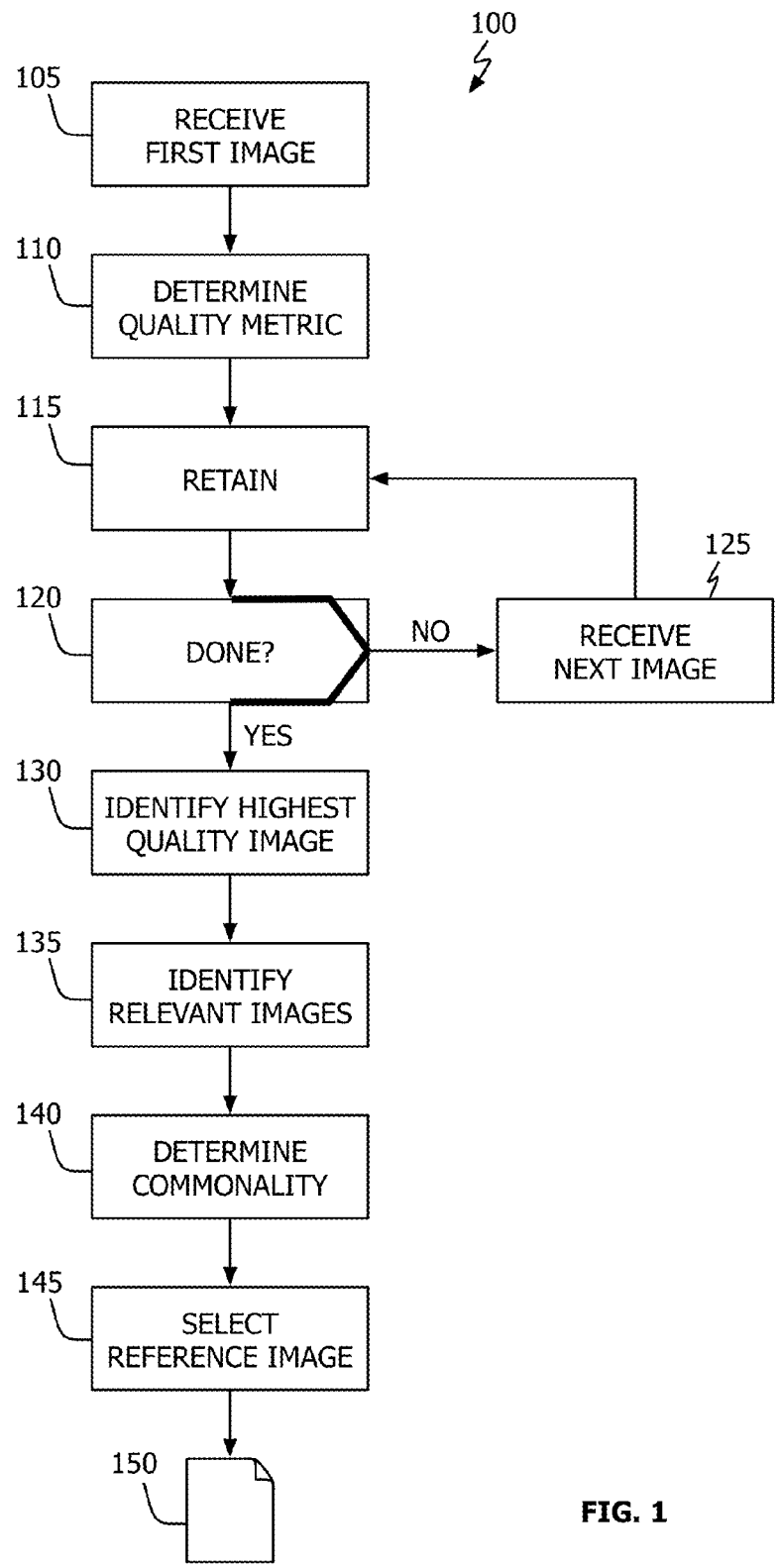
FIG. 1 shows, in flowchart form, an image stabilization operation in accordance with one embodiment.

One novel approach to image stabilization involves identifying a 'best' reference image through a comparison with other captured images. Referring to FIG. 1, in one embodiment according to this approach image stabilization operation 100 begins when a first image of a scene is received (block 105). An image quality metric may then be determined (block 110). In general, quality measures may be determined in accordance with image content or motion sensor data (e.g., gyro and accelerometer sensors). Each approach has certain advantages and disadvantages. For example, image data based quality metrics are typically vulnerable to noise in low light conditions, while sensor based approaches cannot take into account the movement of objects within a scene. These techniques may be used separately, or combined together, depending on the particular use case and/or system resources. In one particular embodiment, output from a camera's AF and/or AE systems may be used to generate a quality metric during normal lighting conditions while the camera's motion sensor(s) may be used during low light conditions. In some embodiments, the quality metric may be based on the entirety of an image while in other embodiments the quality metric may be based on one or more selected regions of the image (e.g., tiles or bands). In one specific embodiment, the quality metric could be indicative of the image's sharpness. Sharpness values may be obtained or determined from, for example, a camera's auto-focus (AF) and/or auto-exposure (AE) systems. In some implementations, secondary criteria may be applied once the chosen sharpness metric is satisfied. For example, output from a face recognition system (and, more generally, an object detection system) could be evaluated for specified characteristics (e.g., open eyes, specified geometries) for those brackets or frames satisfying the sharpness metric criteria. Acts in accordance with block 110 could determine these values as well. Metric values may be associated with each image directly (e.g., stored with the image as metadata) or indirectly (e.g., through a separate index or database file). As used herein, the term "camera" refers to any electronic device that includes or incorporates digital image capture functionality. This includes, by way of example, stand-alone cameras (e.g., digital SLR cameras and 'point-and-click' cameras) as well as other electronic devices having embedded camera capabilities. Examples of this latter type include, but are not limited to, mobile phones, tablet and notebook computer systems, and digital media player devices.

Once a quality metric (e.g., sharpness and/or a specified one or more secondary criteria) for the first image have been determined in accordance with block 110, the image may be retained (block 115), whereafter a check can be made to determine if all of the images from the series of images have been received (block 120). In one embodiment, special image buffer memory may be used to retain captured images. In another embodiment, general purpose memory may be used. If at least one more image remains to be received (the "NO" prong of block 120), the next image may be obtained (bock 125) whereafter image stabilization operation 100 continues at block 115. After all expected images have been received (the "YES" prong of block 120), that image corresponding to the highest quality metric value may be identified (block 130). In practice, multiple images may have the same, or nearly the same, quality metric value.

In such cases, the first received image having the highest quality metric value may be selected in accordance with block 130. In another embodiment, the last such image received may be selected. In still another embodiment, of those images having the highest quality metric value, that image closest to the middle of the window during which the image series was captured may be selected. In yet another embodiment, if there are 'N' images having the highest quality metric value, a random one of the N images may be selected. That image identified in accordance with block 130 may then be used to identify relevant images (block 135). In one embodiment, "relevant" images are those images deemed to be not blurry (or not "too" blurry). In some embodiments, a ratio between the sharpness metric value of the sharpest image (i.e. identified in accordance with block 130) and each of the other captured images may be determined. Those images for which this ratio is less than some specified value, could be eliminated from further consideration as irrelevant. That is, only those images having a ratio value greater than a specified threshold would be considered relevant when performing acts in accordance with blocks 140-145. One of ordinary skill in the art will recognize the selected threshold may be task or goal dependent and could vary from implementation to implementation. Next, a commonality or similarity metric value for the relevant images may be determined (block 140). Conceptually, a commonality measure in accordance with block 140 indicates how various objects in two images are in the same place.

Figure 2:
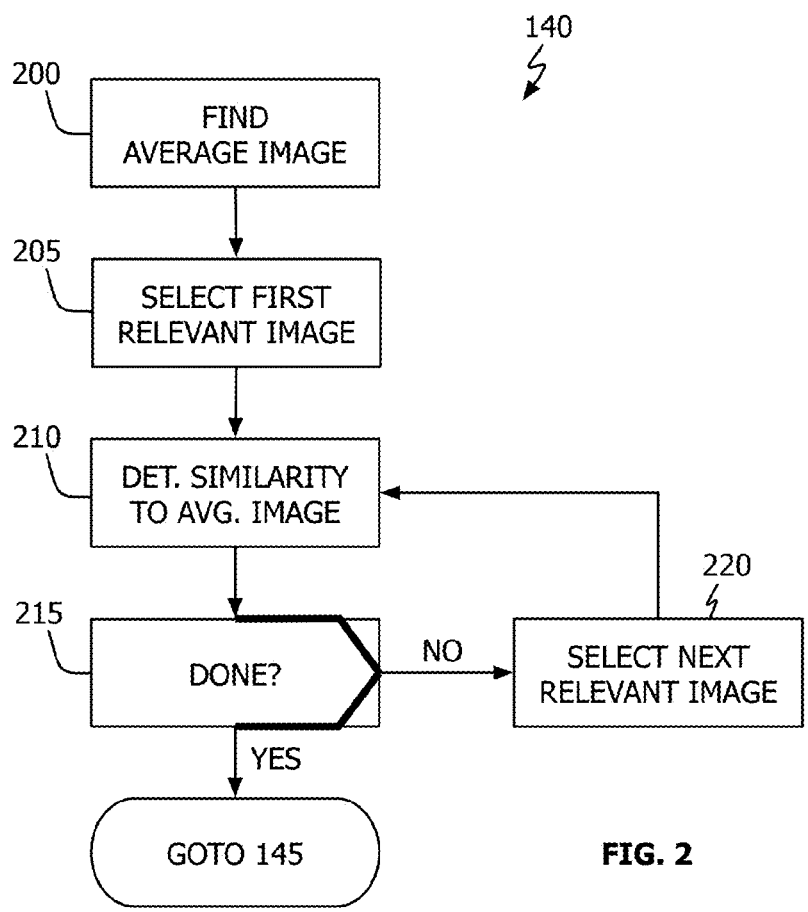
FIG. 2 shows, in flowchart form, a similarity measure determination operation in accordance with one embodiment.

Referring to FIG. 2, generation of commonality or similarity measures for the relevant images in accordance with block 140 may begin by finding an average image from the relevant images (block 200). In one embodiment, the average image comprises a pixel-by-pixel average of all of the relevant images. In another embodiment, a pixel-by-pixel median of all of the relevant images could be used. In still another embodiment, only the gradient (edge) information from the relevant images may be evaluated. A first of the relevant images may then be selected (block 205) and compared against the average image to determine its similarity (block 210). In one embodiment, an image's similarity to the average image may be given by the mean-absolute-error between the two on, for example, a pixel-by-pixel basis. In another embodiment, an image's similarity to the average image may be given by the mean-square-error between the relevant and the average images (e.g., on a pixel-by-pixel basis). A check may then be made to determine if additional relevant images remain to be compared to the average image (block 215). If images remain to be processed in accordance with block 140 (the "NO" prong of block 215), the next relevant image may be selected (block 220), whereafter operation 140 resumes at block 210. If all the relevant images have been processed in accordance with block 140 (the "YES" prong of block 215), image stabilization operation 100 continues at block 145.

Returning to FIG. 1, following the completion of block 140, one of the relevant images may be selected as the reference image (block 145). In one embodiment, that image having the highest commonality metric value may be selected as reference image 150. In the approach to image stabilization described here, only those images deemed relevant (e.g., not blurry) based on a comparison of quality metric values contribute to the final fused image. In another embodiment, motion sensor data (e.g., an accelerometer or gyro sensor) may be used to identify blurry images. Only non-blurry images would be deemed relevant in accordance with block 140. In yet another embodiment, actions in accordance with block 110 may take into account motion sensor data. If this information indicates a "too blurry" image (for example, a large or violent shake), the image may be rejected (deemed irrelevant) whereafter operation 100 could "jump" from block 130 to 140, ignoring block 135.

Figure 3:
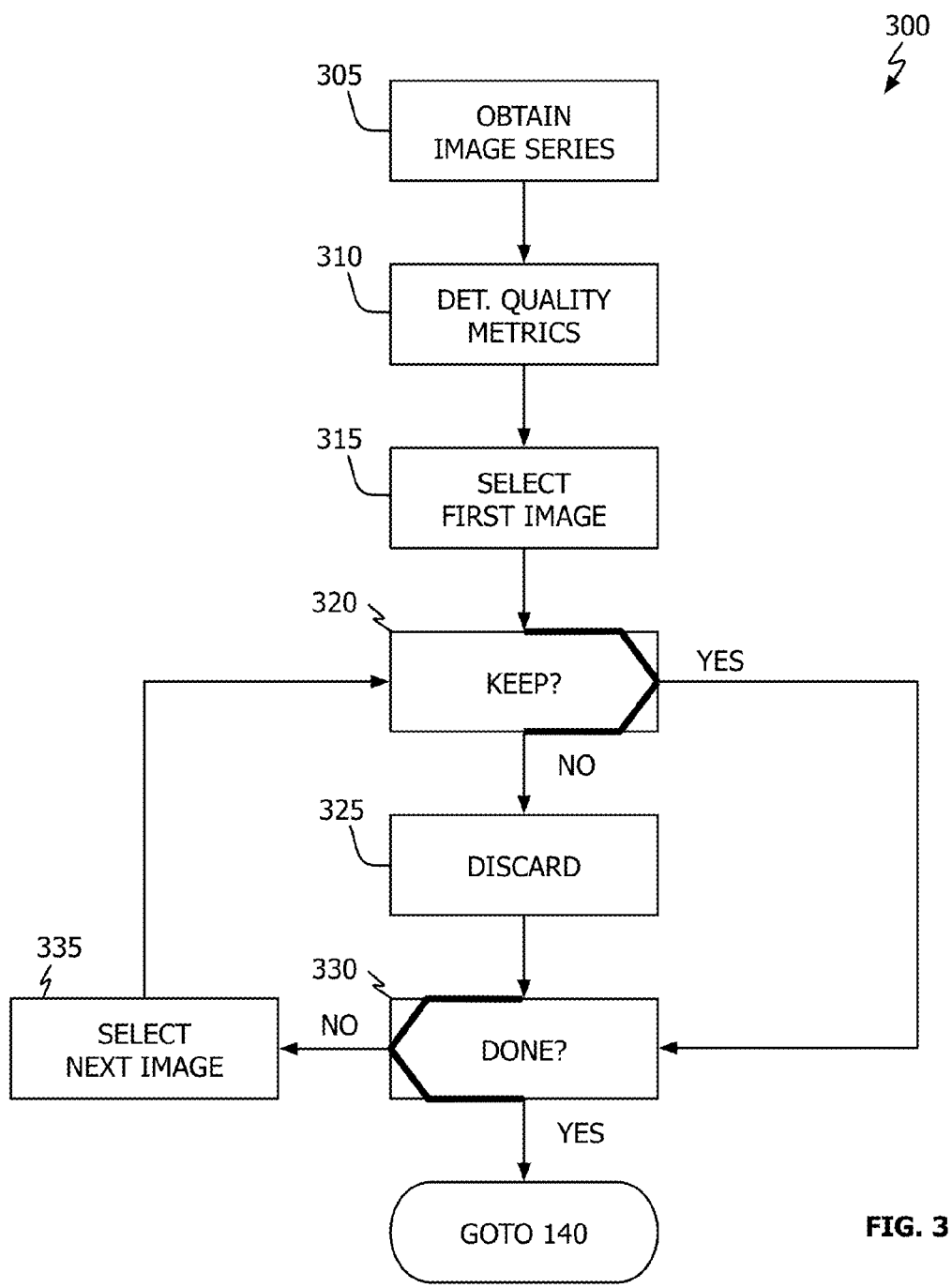
FIG. 3 shows, in flowchart form, an image stabilization operation in accordance with another embodiment.

Referring to FIG. 3, in one embodiment according to this approach, image stabilization operation 300 begins by capturing a series of images of a scene (block 305). A quality metric for each image may then be determined (block 310), whereafter a first of the obtained images may be selected (block 315). As discussed above, quality metric values may be based upon image content (of the entire image or a portion thereof) and/or camera sensor data. A determination of whether the selected image is "too blurry to use" may then be made (block 320). One approach to determining the amount of blur present in an image is shown in APPENDIX A: Blur Determination in a Rolling-Shutter Image Capture Device.

If the selected image is determined to be too blurry to use (the "NO" prong of block 320), the image may be discarded or otherwise removed from further consideration during image stabilization operation 300 (block 325) and a check made to determine if at least one of the obtained images remain to be processed (block 330). By way of example, if the selected image's quality metric is below some threshold value the image may be determined to be too blurry to use. As previously noted, threshold values may be static (obtained, for example, from program memory during camera start-up) or dynamic (determined, for example, based on image statistics). In another embodiment, if the quality metric of an image is significantly smaller than the maximum quality metric value of the image set, the image may be regarded as too blurry to use. In one implementation, if the quality metric of an image is smaller than the maximum quality metric value of the image set multiplied by a ratio, the image may be regarded as too blurry to use (e.g., a ratio of 0.8). If at least one image obtained in accordance with block 305 remains to be evaluated (the "NO" prong of block 330), the next image from the obtained image set may be selected (block 335), whereafter operation 300 continues at block 320. If all the obtained images have been evaluated (the "YES" prong of block 330), image stabilization operations in accordance with this disclosure may, in one embodiment, continue at block 140 of FIG. 1.

The accuracy of a quality metric such as sharpness depends on image content such as scene brightness and the availability of texture and edges. For example, the value of a sharpness metric can change if a portion of the image's content changes—even if the actual sharpness of the image remains the same. To address this issue, the selected quality metric (e.g., sharpness) may be based on multiple images (or multiple portions of images) from the set of obtained images. For example, once an image set's quality measures have been determined (e.g., in accordance with block 310), those images with the largest quality measures may be selected. The number of images selected may be predefined or dynamically determined. The quality metric values of the selected images may be averaged and used, for example, during actions in accordance with block 320.

Image stabilization operations in accordance with this disclosure capture a burst sequence of images, then blend or fuse them to create a final image. The quality of the resulting fused image can be made to increase if it is possible to pick the "best" images from a larger selection of images. In practice, image sequences are typically stored in limited capacity image buffer memory during the capture process (e.g., temporary RAM). The number of available image buffers limits the maximum number of images that may be retained and, therefore, from which the "best" images may be selected.

With this recognition, another approach to image stabilization in accordance with this disclosure evaluates each image upon capture and retains it in temporary memory only if it satisfies a specified criteria with respect to images already captured during the burst capture process. In this way, only the "best" images (as defined by the chosen criteria) are retained for processing in accordance with, for example, stabilization operations 100 (FIG. 1) or 300 (FIG. 3).

Figure 4:
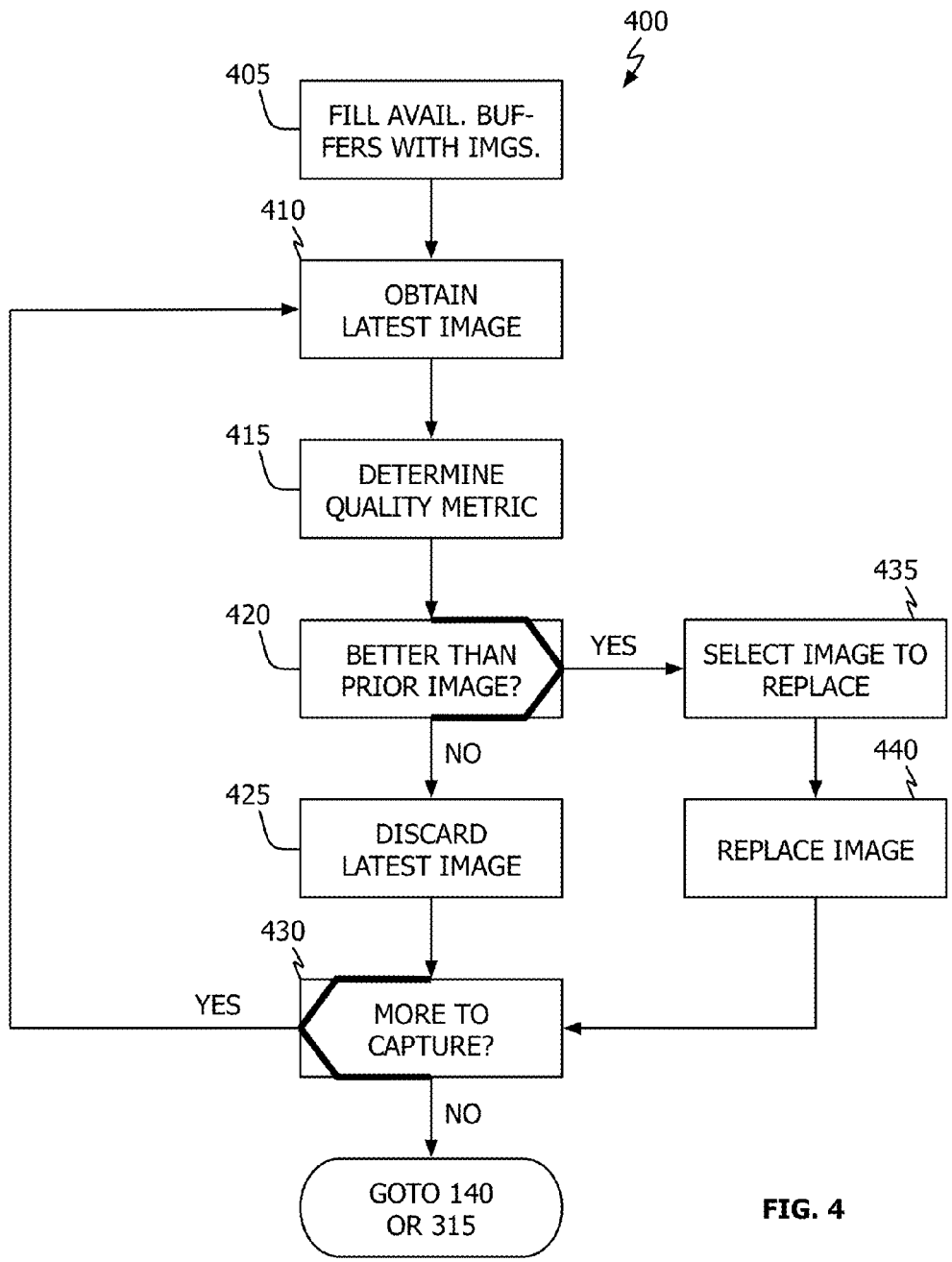
FIG. 4 shows, in flowchart form, an image capture operation in accordance with one embodiment.

Referring to FIG. 4, image capture operation 400 in accordance with one embodiment initially captures enough images to fill the available buffer memory (block 405). In one implementation, a quality metric for each image may be determined for each image captured in accordance with block 405. Once the allocated buffer memory is full, a latest (i.e. next) image may be captured (block 410) and its quality metric determined (block 415). The latest image may then be compared to those images already captured and in buffer memory (block 420). If the latest image is not better than at least one of the prior captured images (the "NO" prong of block 425), it may be discarded (block 430), whereafter a check may be made to determine if all images to be captured during operation 400 have been captured (block 430). If the latest image is better than at least one prior captured image (the "YES" prong of block 425), one of the prior captured images may be selected (block 435) and replaced with the latest image (440), whereafter image capture operation 400 continues at block 430. If all images have been captured (the "NO" prong of block 430), image capture operation 400 may be considered complete. If at least one image remains to be captured/obtained and evaluated (the "YES" prong of block 430), image capture operation 400 may continue at block 410 in which a new "latest" image may be obtained.

With respect to the quality metrics determined in accordance with block 415, they may be generated in any way that makes sense and is appropriate for a particular implementation. For example, a sharpness quality metric may be generated from AF and/or AE system output and/or from camera motion sensor data (e.g., from a gyro or accelerometer). For the purposes of this discussion, the sharper an image is judged to be, the higher it's corresponding rank (e.g., quality metric value). With respect to the determination made in accordance with block 420, the specific criteria may once again be specified in any way that makes sense and is appropriate for a particular implementation. In one embodiment, this determination may be based on a comparison of both rank (e.g., sharpness) and similarity. By way of example, a test in accordance with block 420 may be specified as follows:

$$\text{If } \{[\text{If } R(L) > R(O_i)] \text{ and } [S(L,H1) > S(O_i,H1)] \text{ and } [S(L,H2) > S(O_i,H2)]\}$$

$$\text{Then replace image } O_i \text{ with image } L \text{ in memory,} \quad \text{EQ. 1}$$

where L represents the latest image, H1 represents the highest ranked image already in image buffer memory, H2 represents the second highest ranked image already in image buffer memory, $O_i$ represents the ith image already in image buffer memory other than images H1 and H2, 'i' runs from 1 to 'N−2' where N represents the number of image storage buffers, R(A) represents the rank of image A (e.g., sharpness or other quality metric value), and S(A, B) represents the similarity between images A and B.

In practice the determination of whether, and which, image to swap out would more likely be expressed in terms of weights on measured values (e.g., R(A)) such as:

$$\text{If } [\{a \times R(L)\} + \{b \times S(L,H1)\} + \{c \times S(L,H2)\}] > \text{MIN}[\{a \times R(O_i)\} + \{b \times S(O_i,H1)\} + \{c \times S(O_i,H2)\}]$$

$$\text{Then replace image } O_i \text{ with image } L \text{ in memory,} \quad \text{EQ. 2}$$

where a, b, and c are weights determined in accordance with the particular implementation's goals and R( ), S( ), L, H1, H2, and $O_i$ are as defined above. In this embodiment, image $O_i$ with the lowest MIN[ ] score would be replaced with image L. It should be noted, image capture operation 400 does not itself identify a reference image. Operation 400 merely retains images (the best 'N' where N represents the number of image buffers available to the image capture process).

As noted above with respect to FIG. 1, motion sensor data may be used to identify "too blurry" images—such images may be detected and discarded or otherwise removed from consideration before the resources to compare it with prior captured and retained images are used. By way of example, actions in accordance with block 415 may take into account motion sensor data. If this information indicates a "too blurry" image (e.g., a large or violent shake), the image may be rejected whereafter operation 400 could "jump" from block 410 to 425 (not shown in FIG. 4).

In another embodiment, a temporal constraint may also be used. For example, identification of images H1 and H2 may be tied to a temporal limit with respect to latest image L. In one embodiment, only those images in buffer memory that were captured within "X" milliseconds of latest image L are eligible for evaluation (e.g., in accordance with EQ. 1). The value of "X" could be anything that makes sense for the particular implementation (e.g., 50% of the total time during which the series of images are captured). A temporal limitation may be implemented via EQ. 2 as a weight or a limitation to the image search distance (N).

Another approach to image stabilization in accordance with this disclosure involves combining images captured using a relatively low ISO (less noisy) and long exposure times with one or more images captured using a relatively high ISO (more noisy) and short exposure times, where the short-exposure images are captured after the long-exposure images. In accordance with this long-short capture approach, the sharper edges of the later captured short-exposure images may be fused/blended with the lower noise surfaces of the long-exposure images. It has been unexpectedly determined that capturing long-exposure image(s) first and short-exposure image(s) last allows for significantly more motion blur to remain in the final blended image, which increases the ability to capture faster motion under lower light conditions. Another unexpected benefit is that this approach can allow for simpler blend algorithms to be used, thereby speeding processing time as less registration between images is needed. For example, it is assumed that since the long-exposure images are blurry, a less accurate registration would be enough. (After all, in a blurry image the details are washed out.) Blending between the sharp and a blurry image is more complex as the operation needs to use the edge information only from the sharp (short-exposure) image and the color and noise characteristics from the blurry (long-exposure) image. In general, the sharp image is much noisier than the blurry image but, due to the exposure time differences, the sharp image captures edge information better that the long-exposed blurry images.

Figure 5:
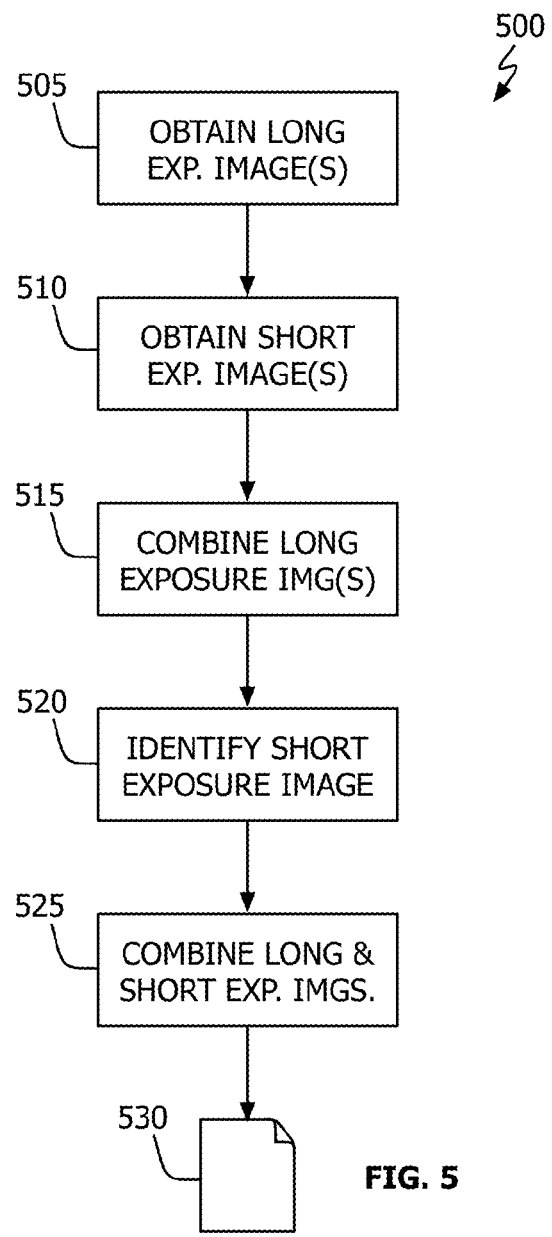
FIG. 5 shows, in flow-chart form, a long-short capture operation in accordance with one embodiment.

Referring to FIG. 5, one embodiment of long-short capture sequence 500 in accordance with this disclosure begins by capturing one or more long-exposure images (block 505) after which an additional one or more short-exposure images are captured (block 510). As used herein, the phrases "long-exposure" and "short-exposure" are relative to one another. In practice "long-exposure" images may be anywhere from, for example, 1.5 to some arbitrarily large number of times longer than short-exposure images. If multiple short-exposure images were captured during block 510, a reference or base image from those images may be selected and one or more of the long-exposure images may be combined (block 515). Actions in accordance with block 515 may, for example, use techniques described herein such as image stabilization operation 100. It should be noted that long-short capture sequence 500 may also use any of the techniques described herein with respect to FIGS. 2-4. Identification of a short-exposure image (block 520) may be made in a number of ways. In one embodiment, a reference image from the one or more short exposure images may be identified (e.g., see operation 500) and fused with the remaining short exposure images (block 525). In another embodiment, the short-exposure reference image itself may be used in subsequent operations. In yet another embodiment, the short exposure images' reference image may be identified and combined/fused with some, but less than all, of the other captured short-exposure images. Once the individual long-exposure and short-exposure images are determined in accordance with blocks 515 and 520, they may be combined (block 525) in any manner useful for the particular embodiment to generate output image 530. As with the prior described operations, motion sensor data may be incorporated into long-short capture sequence 500. For example, any long-exposure images captured in accordance with block 505 or short-exposure images captured in accordance with block 510 may be summarily rejected if motion sensor data for those images indicate it would be "too blurry." This can happen, for example, if the motion sensor indicates a severe motion—above some specified threshold.

In still another embodiment, it may be desirable to create an image where the primary subject is sharp and the direction of motion itself is clearly indicated through motion streaks. Some of the benefits of creating still images which show some motion are: (1) the images tend to be smaller and are therefore easier to share; (2) the images can have higher resolution and image quality than a video sequence of the same motion; and (3) such an operation leaves room for the viewer to use his/her imagination. In the prior art, this type of effect can be created through the use of a powerful flash fired right before the shutter closes, or through the manual combination of images using programs such as Aperture® and Adobe Photoshop®. (APERTURE is a registered trademark of Apple Inc. ADOBE PHOTOSHOP and PHOTOSHOP are registered trademarks of Adobe Systems Incorporated.) Both of these methods can be undesirable for an individual using a compact consumer camera such as those found in mobile phones, personal entertainment devices, and compact stand-alone digital cameras. In many compact camera's the flash is not powerful enough to implement the first of these approaches. And, many users are not interested in purchasing and learning to use sophisticated graphics applications such as those identified here. It has been determined that images of the type described here may be produced as illustrated in FIGS. 6A and 6B.

Figure 7:
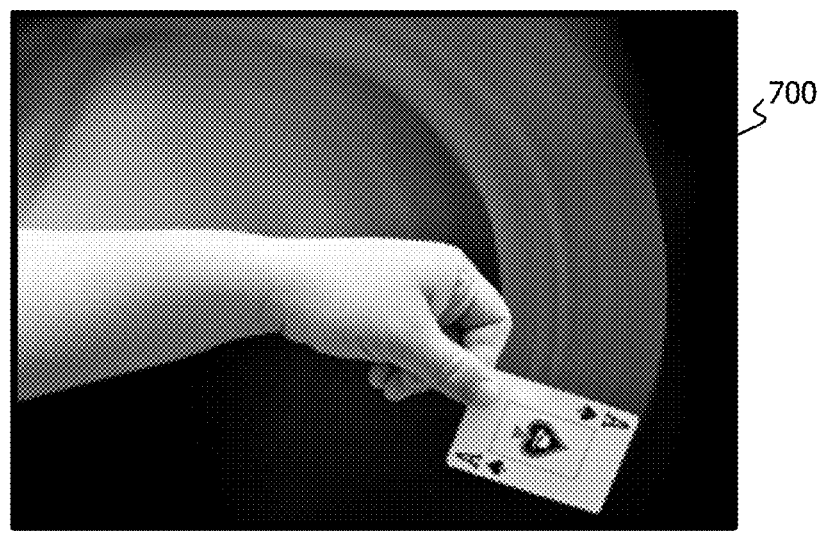
FIG. 7 shows an example of an image captured in accordance with the operations of FIG. 6A.
Figure 6A:
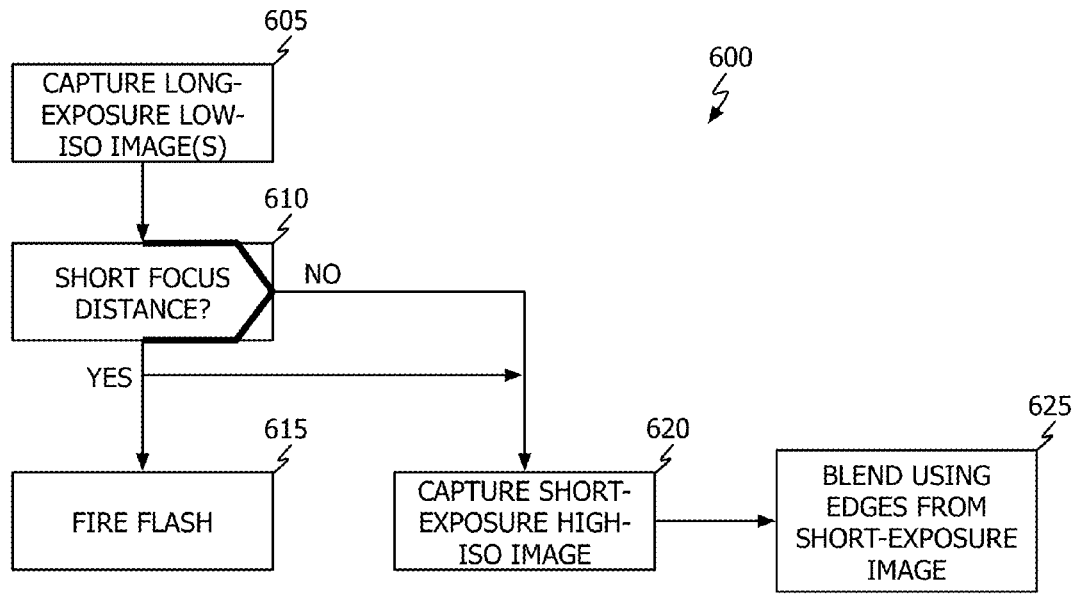
FIGS. 6A and 6B show two illustrative image capture sequences (in flow-chart form) that may be used to purposefully capture motion artifacts in an image.

Referring to FIG. 6A, an operation well suited to capturing images in low light conditions (600) begins by capturing a burst of relatively long-exposure low-ISO images (block 605). Immediately before capturing a final image, a test can be made to determine if the focus distance is short (e.g., 2 meters or less is typical for an image capture system embedded in, for example, a mobile phone). If the focus distance is short (the "YES" prong of block 610), the flash may be fired (block 615) at the same time a final short-exposure high-ISO image captured (block 620). As discussed above, the edges from the short-exposure image and the surface information (e.g., texture data) from the long-exposure images may be combined to form a final image (block 625). In practice, it has been found beneficial to combine the long-exposure images first; combining the resulting image with the short-exposure image to generate a final or output image. In one embodiment the mode of image capture described here could be user-specified (e.g., through a user setting). Factors that can affect the amount of displayed blur include the light level, the amount of zoom employed, the amount of scene motion, and the ratio of long-to short-exposure times. By way of example, the difference between long and short-exposure times could be a factor of approximately 1.5 to approximately 10 while the difference between low- and high-ISO settings may be set so as to compensate for the difference in exposure times and to maintain the same image brightness. One example of an image captured in accordance with operation 600 may be seen in FIG. 7. One benefit of this approach (600) can be the ability to overlay the short-exposure image onto the combined long-exposure image, thereby avoiding the need to perform a final de-ghosting operation.

Figure 6B:
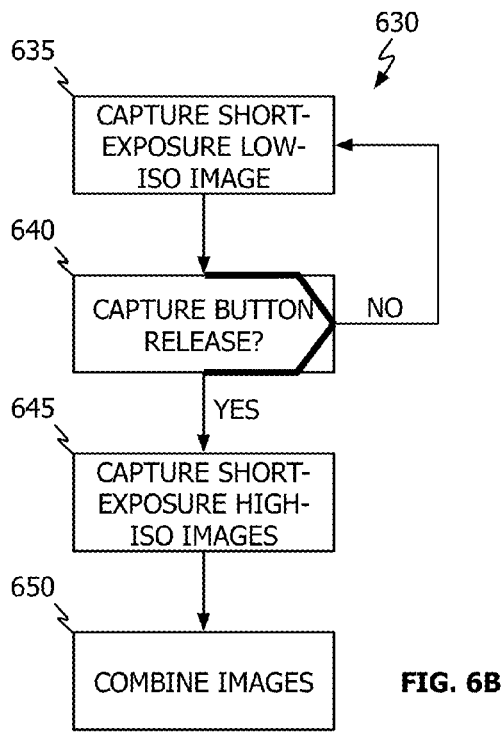

Referring to FIG. 6B, an operation well suited to capturing images in higher light conditions 630 begins by capturing a short-duration low-ISO image (block 635). After each capture, a check may be made to determine if the image capture button has been released (block 640). If the button has not been released (the "NO" prong of block 640), another short-exposure low-ISO image may be captured in accordance with block 635. If the image capture button is released (the "YES" prong of block 640), a final short-exposure high-ISO image may be captured (block 645). The captured images may then be combined as described above (block 650). The difference in exposure times between images captured in accordance with blocks 635 and 645 could be a factor of, for example, 1 to 8. Although operation 630 has been described in terms of a mechanical image capture button, the same approach may be used on devices that use a software-generated user interface. Here, the time during which a user contacts the user interface's image capture icon (typically made to look like a button) may correspond to the mechanical button press.

Referring to FIG. 8, a simplified functional block diagram of illustrative electronic device 800 is shown according to one embodiment. Electronic device 800 could be, for example, a mobile telephone, personal media device, portable camera, or a tablet, notebook or desktop computer system. As shown, electronic device 800 may include processor 805, display 810, user interface 815, graphics hardware 820, device sensors 825 (e.g., proximity sensor/ambient light sensor, accelerometer and/or gyroscope), microphone 830, audio codec(s) 835, speaker(s) 840, communications circuitry 845, image capture circuit or unit 850, video codec(s) 855, memory 860, storage 865, and communications bus 870.

Processor 805 may execute instructions necessary to carry out or control the operation of many functions performed by device 800 (e.g., such as the capture and/or processing of images in accordance with FIGS. 1-6). Processor 805 may, for instance, drive display 810 and receive user input from user interface 815. User interface 815 can take a variety of forms, such as a button, keypad, dial, a click wheel, keyboard, display screen and/or a touch screen. User interface 815 could, for example, be the conduit through which a user may selects when to capture an image. Processor 805 may be a system-on-chip such as those found in mobile devices and include one or more dedicated graphics processing units (GPUs). Processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 perform computational tasks. In one embodiment, graphics hardware 820 may include one or more programmable graphics processing units (GPUs).

Image capture circuitry 850 may capture still and video images that may be processed to generate images and may, in accordance with this disclosure, include specialized hardware to perform some or many of the actions described herein. Output from image capture circuitry 850 may be processed (or further processed), at least in part by video codec(s) 855 and/or processor 805 and/or graphics hardware 820, and/or a dedicated image processing unit (not shown). Images so captured may be stored in memory 860 and/or storage 865. Memory 860 may include one or more different types of media used by processor 805, graphics hardware 820, and image capture circuitry 850 to perform device functions. For example, memory 860 may include memory cache, read-only memory (ROM), and/or random access memory (RAM). Storage 865 may store media (e.g., audio, image and video files), computer program instructions or software, preference information, device profile information, and any other suitable data. Storage 865 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 860 and storage 865 may be used to retain computer program instructions or code organized into one or more modules and written in any desired computer programming language. When executed by, for example, processor 805 such computer program code may implement one or more of the methods described herein.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). For example, while FIGS. 1-6 have been described in the context of processing raw or unprocessed images, this is not necessary. Image stabilization operations in accordance with this disclosure may be applied to processed versions of the captured images (e.g. edge-maps) or sub-sampled versions of the captured images. In addition, some of the described operations may have their individual steps performed in an order different from, or in conjunction with other steps, that presented herein. An example of this first difference would be performing actions in accordance with block 110 after one or more of the images are retained (e.g., block 115). An example of the latter difference would be the determination of quality metrics, e.g., in accordance with block 110, as each image is captured (as implied in FIG. 100), after all images are captured (e.g., between blocks 105 and 125), or after more than one, but less than all images have been captured. More generally, if there is hardware support some operations described in conjunction with FIGS. 1-6 may be performed in parallel. By way of example and not limitation: referring to FIG. 3, during processing of a first image in accordance with blocks 315-320, quality metrics in accordance with block 310 could be determined, or a quality metric for a first image may be determined in accordance with block 310 while a subsequent image is obtained in accordance with block 305; referring to FIG. 4, selection of a replacement image in accordance with block 435 may be made in parallel with actions in accordance with blocks 410 and 415; and referring to FIG. 5, the long-exposure images may be processed in accordance with block 515 in parallel with the processing of short-exposure operations in accordance with block 520. As a final example, plural short-exposure images could be captured in accordance with operations 620 and 645 (FIG. 6), whereafter the single "best" image could be selected (as determined by some implementation specified criteria such as, for example, sharpness), or the best and most consistent image could be selected (see discussion of image stabilization operation 100), or one or more of the final captured short-exposure, high-ISO images could be combined with the resulting image being used in accordance with blocks 625 and 650.

APPENDIX A

Blur Determination in a Rolling-Shutter Image Capture Device

Figure 9:
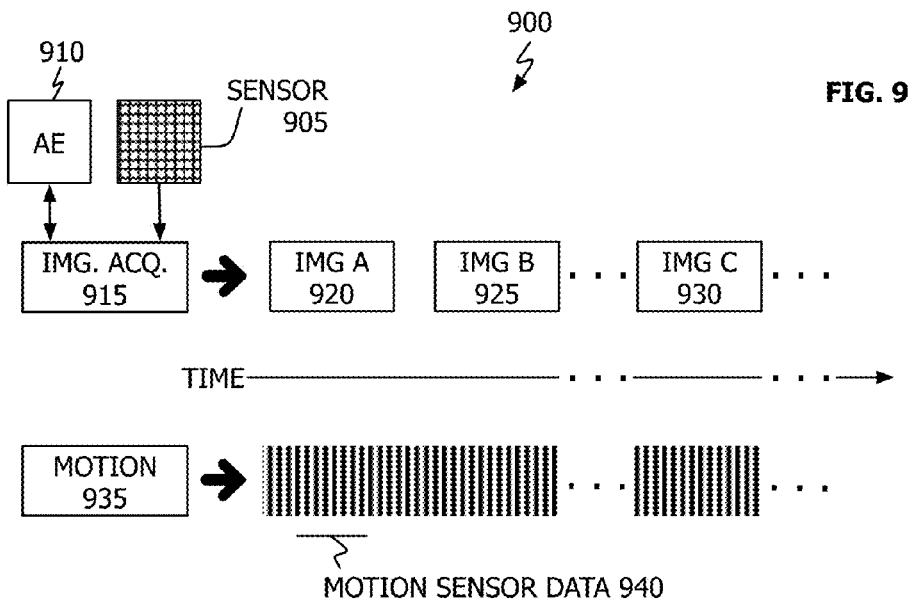
FIG. 9 shows, in block diagram form, a simplified image/motion acquisition system in accordance with one embodiment.

For context, consider FIG. 9. Simplified image capture system 900 includes sensor 905, auto-exposure (AE) system 910, and image acquisition circuit 915. By way of example, sensor 905 may be a 5 megapixel (2592-by-1944), 8 megapixel (3264-by-2448) or 12 megapixel (4288-by-2848) CMOS sensor. It will be generally understood that AE systems are designed to find a camera's optimal exposure value (EV)—that combination of shutter-speed/exposure time, sensor gain, and aperture that allows a "targeted" amount of light to fall on the imaging sensor (e.g., sensor 905). It will also be understood that what the "targeted" amount of light is depends, at least in part, on the intended use of the camera. Without limiting this disclosure in any way, in the following it will be assumed that an image capture device operated in accordance with this disclosure has a fixed aperture. This, for example, is true for many cameras embedded in other electronic devices such as mobile telephones, personal entertainment devices, and portable and tablet computer systems. Image acquisition circuit 915 may, without limitation, be implemented via specialized hardware and/or processors under software control. During video capture or preview operations image acquisition circuit can provide a series of images 920, 925 and 930. Image acquisition circuit 915 may, for example, provide between 15 and 30 preview images per second (each preview image being displayed for a short period of time, e.g., the amount of time between successive image captures). Contemporaneous with image acquisition operations by circuit 915, motion sensor 935 may provide regular measurements 940 of system 900's movement. Illustrative motion sensors include, but are not limited to, gyro sensors and/or accelerometers. In one embodiment, motion sensor 935 provides motion data 940 independent of, and at a higher rate than, the generation of images by image acquisition circuit 915. For example, motion sensor 935 may provide 150 measurements each second while image acquisition circuit 915 may provide 20 images per second. Even though image acquisition and motion data may be captured at different rates and/or independent of one another, each image may have one or more temporally corresponding motion data samples. For example, all those motion data samples relevant to the analysis of an image in accordance with this disclosure may be said to be "temporally related." It is common for each image to have associated with it timestamp metadata indicating when the acquisition operation for that image began and ended. Similarly, each motion data sample typically includes timestamp metadata indicating when it was captured. These timestamps may be used to correlate or match specific motion measurements (e.g., motion sensor data 940) with specific images (e.g., images 920, 925, and 930); that is, to identify temporal correspondence between images and motion data.

Image acquisition circuit 915 will be assumed to receive image data from sensor 905 one row (or column) at a time in a technique known as "rolling shutter." In this approach, a first row (column) of sensor 905 is exposed for a specified time (the row or column integration time) during which the exposed sensor (pixel) sites acquire photons. At the end of the specified integration time, acquisition circuit 915 samples the row's (column's) resulting pixel values and stores them in a memory (not shown, although this memory can be part of acquisition circuit 915). This process is repeated row-by-row (column-by-column) until the entire image is captured. Although the starting and ending times at which all rows (columns) are read are different, the duration of integration times are the same which corresponds to the image's exposure time. The sum total of all time during which acquisition circuit 915 obtains output from imaging sensor 905 is referred to as the "rolling shutter readout time" or, more simply, "readout time." (In the following, image capture operations are discussed in terms of a rolling shutter system that captures rows (as opposed to columns). It will be recognized that a similar implementation may be made based on the capture of columns.)

Figure 10:
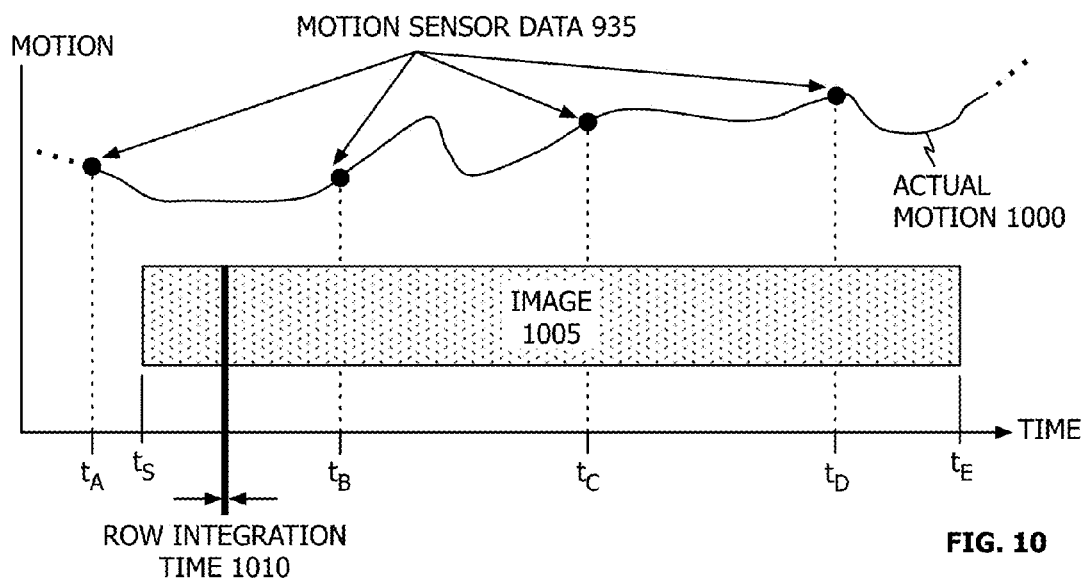
FIG. 10 illustrates a camera motion as a function of time in accordance with one embodiment.

Since motion data 940 are typically generated at a much higher rate than images so that several motion data samples may be acquired during the capture of each image. However, because each image is typically made up of a large number of rows (e.g., 2448), many rows may be acquired between each motion data sample. This situation is illustrated in FIG. 10, where a camera's actual motion 1000 is plotted as a function of time during the acquisition of image 1005. As noted above, image 1005 is generally composed of a large number of rows so that many rows are acquired between each motion data sample—one of which is illustrated as element 1010.

Figure 11:
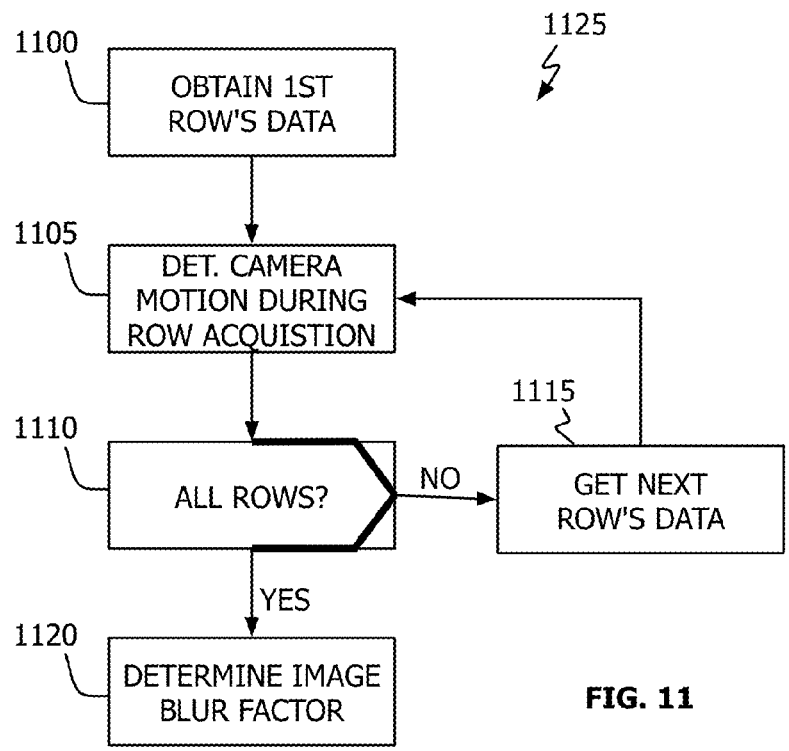
FIG. 11 shows, in flowchart form, an image blur determination operation in accordance with one embodiment.

Referring to FIG. 11, image blur determination operation 1125 in accordance with one embodiment may begin by capturing the image's first row of data with, for example, image acquisition circuit 915 and imaging sensor 905 (block 1100) and, as described in more detail below, the camera's motion during the row's acquisition determined (block 1105). A check to determine if all the rows in the image have been obtained and evaluated can then be made (block 1110). If at least one row remains to be acquired from the sensor (the "NO" prong of block 1110), the next row of data may be acquired (block 1115), whereafter operation 1125 resumes at block 1105. If, and again as discussed in more detail below, all rows in the image have been acquired and evaluated (the "YES" prong of block 1110), the individual motion for each row may be combined to generate an image blur factor (block 1120).

Figure 12:
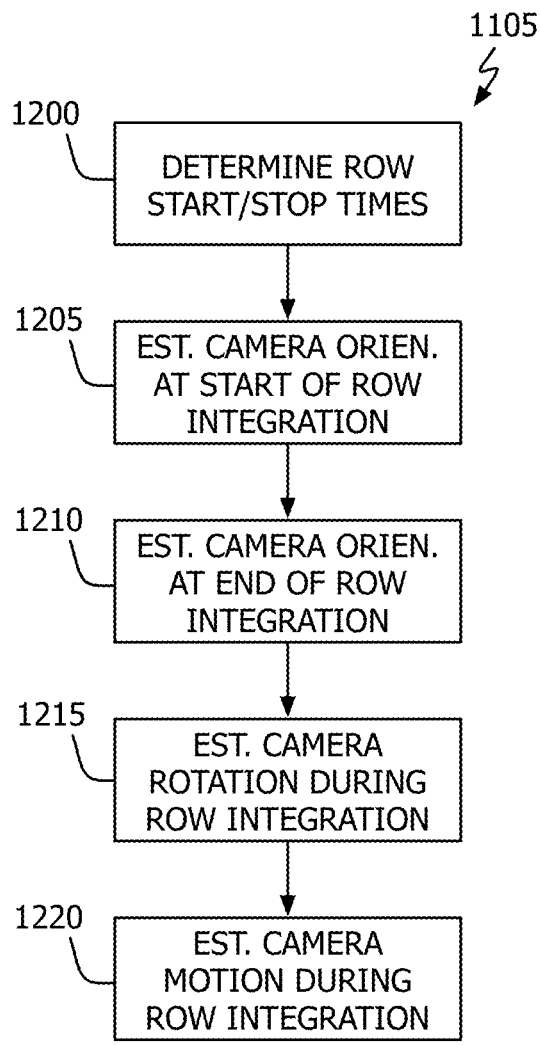
FIG. 12 shows, in flowchart form, an operation to determine a row's motion during image acquisition in accordance with one embodiment.

Referring to FIG. 12, in one embodiment the motion of each row during image acquisition in accordance with block 1105 may be determined using an image's timestamp information, the camera's rolling shutter readout and row integration times, and camera motion information (e.g., obtained from motion sensor 935). The row integration stop and start times may be determined as follows (block 1200):

$$startIntegrationTime(i) = startIntegrationTime(0) + \left(\frac{i}{h-1}\right) readoutTime \quad \text{EQ. 3A}$$

and $$endIntegrationTime(i) = startIntegrationTime(i) + integrationTime, \quad \text{EQ. 3B}$$

where "startIntegrationTime(i)" represents the time at which photon capture for the ith row begins, "startIntegrationTime (0)" represents the time at which photon capture for the $0^{th}$ or first row in the image begins (this can correspond to the image's timestamp metadata), "endIntegrationTime(i)" represents the time at which photon capture for the $i^{th}$ row ends, "readoutTime" represents the rolling shutter readout time, and "h" represents the number of rows of pixels in the sensor.

Figure 13:
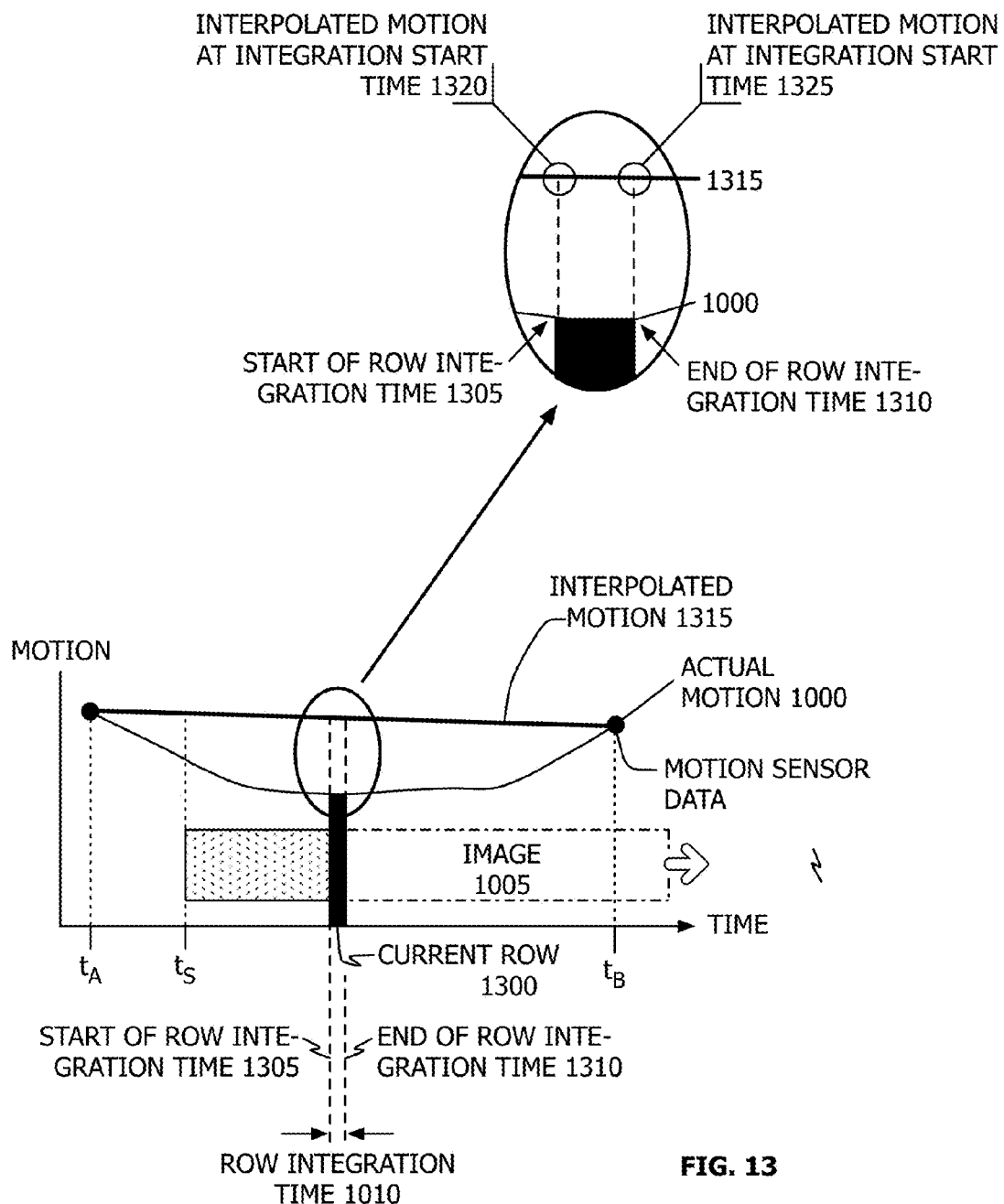
FIG. 13 illustrates a means to estimate a camera's motion between motion sensor data points in accordance with one embodiment

The camera's orientation at the start of the current row's integration period may be estimated by interpolating between the two most recent motion sensor samples that bracket the row's capture time (block 1205). Referring to FIG. 13 (an expanded view of part of FIG. 10), current row 1300's start of integration time 1305 and end of integration time 1310 occur between actual motion sensor data samples at $t_A$ and $t_B$. One approach to estimating an unknown between two known values is through interpolation. In one embodiment, linear interpolation (line 1315) may be used to estimate the camera's orientation at the start of the current row's integration time 1320. In another embodiment, non-linear interpolation techniques may be used (e.g., polynomial, or splines). It will be recognized, the camera's intended operational environment may be used to guide the selection of one technique over another. The camera's orientation at the end of the current row's integration period 1310 may be estimated in the same fashion (block 1210).

With camera orientations at the start and end of the current row's integration operation known, the camera's rotation during this period may be determined in accordance with any one of a number of known methods (block 1215). It is common to express rotations of this nature by a 3-by-3 rotation matrix [R], which may be represented as follows:

$$[R] = \begin{bmatrix} R_{00} & R_{01} & R_{02} \\ R_{10} & R_{11} & R_{12} \\ R_{20} & R_{21} & R_{22} \end{bmatrix}. \quad \text{EQ. 4}$$

With [R] known, camera motion about, for example, the x-axis ($t_x$) and y-axis ($t_y$) may be determined as follows (block 1220):

$$t_x = f\left(\frac{R_{02}}{R_{22}}\right) \text{ and} \quad \text{EQ. 5A}$$

$$t_x = f\left(\frac{R_{02}}{R_{22}}\right), \quad \text{EQ. 5B}$$

where "f" represents the camera's focal length (an intrinsic camera parameter).

Figure 14A:
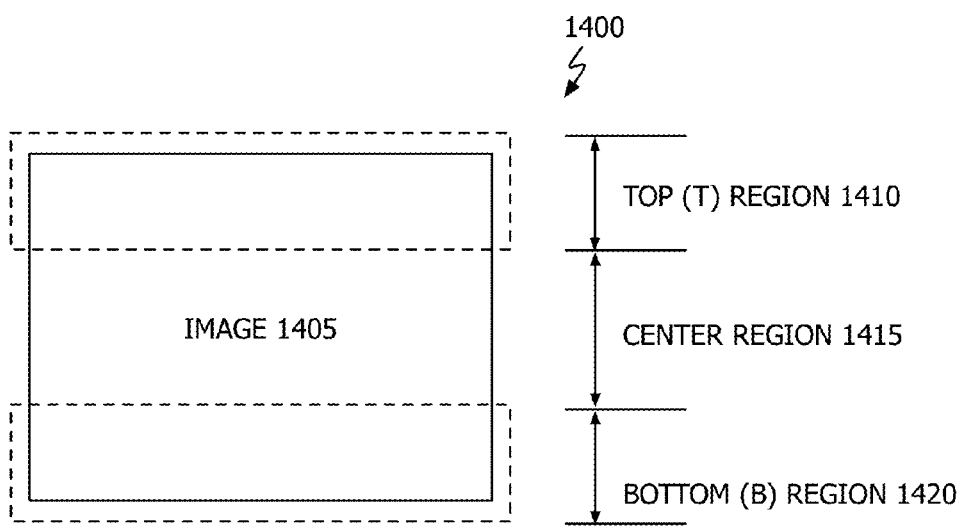
FIGS. 14A-14D show row weighting regimes in accordance with various embodiment.
Figure 14B:
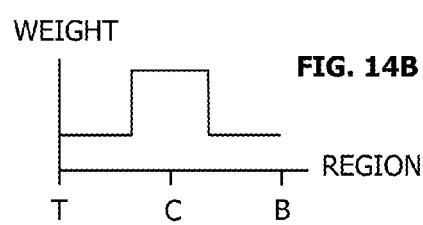
Figure 14C:
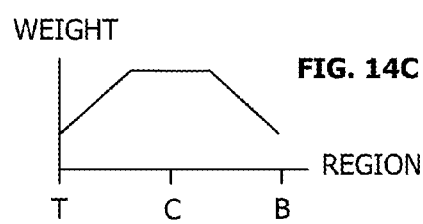
Figure 14D:
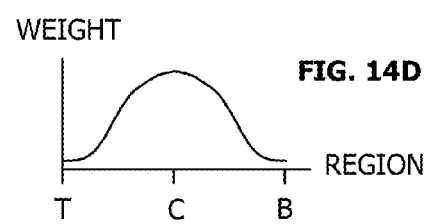

With the information provided by EQS. 5A and 5B known for each row, in one embodiment the image's blur factor in accordance with blocks 1125 and 1120 may be found as follows:

$$\text{Blur}(x) = \frac{\sum_{i=0}^{h-1} \omega(i) \times \|t_x(i)\|}{\sum_{i=0}^{h-1} \omega(i)} \text{ and} \quad \text{EQ. 6A}$$

$$\text{Blur}(y) = \frac{\sum_{i=0}^{h-1} \omega(i) \times \|t_y(i)\|}{\sum_{i=0}^{h-1} \omega(i)}. \quad \text{EQ. 6B}$$

where ω( ) represents a weight function, "h" represents the total number of rows in the image as previously noted. (The denominators of EQS. 6A and 6B act to normalize the resulting blur values.) It will be appreciated that the selected weighting function may be chosen based on the camera's targeted operating conditions. Referring to FIG. 14A, weighting pattern 1400 in accordance with one embodiment may assign one weight (or weight function) to image 1405's top region 1410, another weight or weight function to center region 1415, and yet another weight or weight function to bottom region 1420. FIGS. 14B, 14C, and 14D illustrate example weighting patterns.

Finally, the blur factor for each axis of measured motion may be combined to generate the overall image's blur factor as called for by blocks 1125 and 1120. In one embodiment the combination may simply be the sum of the individual blur measurements:

$$\text{Image Blur} = \text{Blur}(x) + \text{Blur}(y). \quad \text{EQ. 7A}$$

In another embodiment, the total image blur may be the sum of the squared values of the individual axis-blur measurements:

$$\text{Image Blur} = \text{Blur}(x)^2 + \text{Blur}(y)^2. \quad \text{EQ. 7B}$$

In practice, any combination that the designer deems necessary or useful may be used.

Figure 15:
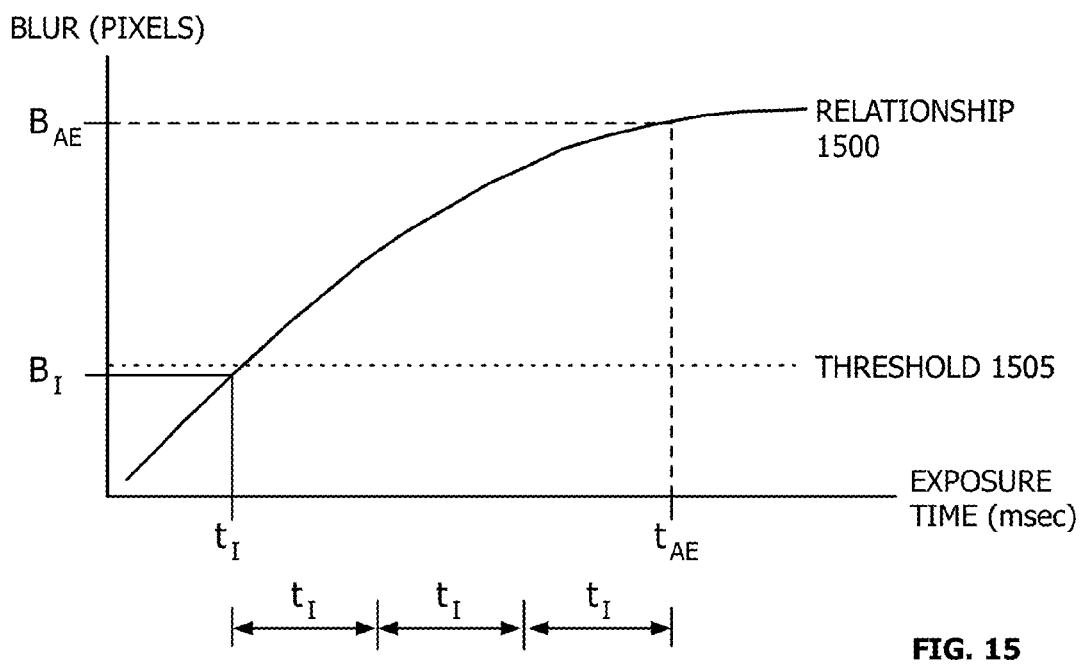
FIG. 15 illustrates a blur-exposure time relationship in accordance with one embodiment.

Referring to FIG. 15, relationship 1500 represents an exemplar camera's exposure time-blur relationship. It has been found that one factor driving the contour or shape of relationship 1500 is user handshake. It has also been noted that, for a given exposure time, blur tends to increase as image resolution increases, since the blur factor determined above is based on the pixel coordinates. Also shown is blur threshold 1505 which embodies the designer's decision as to how much blur is "too much blur." In other embodiments, the blur threshold could be dynamic. For example, for very low light conditions a higher blur threshold may be appropriate to mitigate noise. For purposes of this disclosure, $t_{AE}$ represents the AE system determined exposure time and $g_{AE}$ represents the AE system determined gain.

In one embodiment, an exposure time interval $t_I$ is chosen that (1) yields a blur value less than threshold 1505 and (2) evenly divides into $t_{AE}$. In the example shown in FIG. 15, the selected interval exposure time $t_I$ is such that it breaks the $t_{AE}$ period into 4 intervals. Since the exposure time has been changed (from $t_{AE}$ to $t_I$), so too must the corresponding gain. In one embodiment, the gain used to set the interval EV may be increased by an amount that is directly proportional to the decrease in exposure time. For the example in FIG. 15, because $t_I$ is ¼ that of $t_{AE}$, $g_I$ may be set to $(4 \times g_{AE})$. In another embodiment once $t_I$ has been determined, the camera's own AE system may be used to determine $g_I$. In still another embodiment, a set or predetermined $t_I$ interval may be set and used to build-up to the AE system's exposure time. For example, if the specified $t_I$ is 4 (the units are unimportant for this example) and $t_{AE}$ is 10, then 3 images could be captured so that the total exposure time would be 12 (again, units are unimportant for this example). In implementations in which $t_I$ does not evenly divide into $t_{AE}$, the period during which images are captured would only approximate $t_{AE}$.

In light of the above examples, the scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a programmable control device and comprising instructions stored thereon to cause one or more programmable control devices to:
   obtain a temporal sequence of images of a scene;
   determine, for each of the obtained images, a quality metric value;
   identify, from the obtained images, a set of relevant images based at least in part on the obtained images' quality metric values;
   generate, from the relevant set of images, a temporary image;
   determine, for each image in the set of relevant images, a commonality metric value between the each image and the temporary image;
   identify, from the set of relevant images, a reference image based at least in part on the commonality metric values; and
   combine one or more of the set of relevant images with the reference image to generate an output image of the scene.

2. The non-transitory program storage device of claim 1, wherein the instructions to cause the one or more programmable control devices to determine, for each of the obtained images, a quality metric value comprise instructions to cause the one or more programmable control devices to determine, for each of the obtained images, a value based on at least a portion of the image, wherein the value is indicative of the image's sharpness.

3. The non-transitory program storage device of claim 2, wherein the instructions to cause the one or more programmable control devices to determine, for each of the obtained images, a value based on at least a portion of the image, wherein the value is indicative of the image's sharpness comprise instructions to cause the one or more programmable control devices to determine, for each of the obtained images, a value based on output from at least one of an auto-focus system and an auto-exposure system.

4. The non-transitory program storage device of claim 1, wherein the instructions to cause the one or more programmable control devices to determine, for each of the obtained images, a quality metric value comprise instructions to cause the one or more programmable control devices to determine, for each of the obtained images, a blur value based at least in part on output from one or more motion sensors.

5. The non-transitory program storage device of claim 2, wherein the instructions to cause the one or more programmable control devices to determine, for each of the obtained images, a value based on at least a portion of the image, wherein the value is indicative of the image's sharpness further comprise instructions to incorporate a secondary consideration.

6. The non-transitory program storage device of claim 5, wherein the secondary consideration comprises output from an object detection system.

7. The non-transitory program storage device of claim 1, wherein the instructions to cause the one or more processors to identify, from the obtained images, a set of relevant images comprise instructions to cause the one or more processors to:
   identify a highest quality metric value from the obtained images' quality metric values;
   determine, for each of the obtained images, a relative quality metric value based on a ratio of the image's quality metric value and the highest quality metric value; and
   identify, as a relevant image, all those images from the obtained images having a relative quality metric value greater than a threshold value.

8. The non-transitory program storage device of claim 1, wherein the instructions to cause the one or more processors to generate a temporary image comprise instructions to cause the one or more processors to determine an average image based, at least in part, on each of the relevant images.

9. The non-transitory program storage device of claim 8, wherein the average image comprises a pixel-by-pixel average of each of the relevant images.

10. The non-transitory program storage device of claim 8, wherein the instructions to cause the one or more processors to determine, for each of the relevant images, a commonality metric value comprise instructions to cause the one or more processors to determine a difference value between each of the relevant images and the average image, wherein the difference value represents a commonality metric value.

11. The non-transitory program storage device of claim 1, wherein the instructions to cause the one or more processors to obtain a temporal sequence of images of a scene comprise instructions to cause the one or more processors to:
   obtain an initial temporal sequence of images that includes N images;
   determine, for each of the N images, a quality metric value; and
   retain, as a temporal sequence of images, M of the N images based on the determined quality metric value for each of the N images, where M is less than N.

12. The non-transitory program storage device of claim 11, wherein the instructions to cause the one or more processors to determine, for each of the N images, a quality metric value further comprise instructions to cause the one or more processors to determine, for each of the N images, a similarity metric value.

13. The non-transitory program storage device of claim 12, wherein the instructions to cause the one or more processors to retain, as a temporal sequence of images, M of the N images based on the determined quality metric value for each of the N images comprise instructions to cause the one or more processors to retain, as a temporal sequence of images, M of the N images based on the determined quality metric value and the determined similarity metric value for each of the N images.

14. The non-transitory program storage device of claim 13, wherein the similarity metric value between two images is based, at least in part, on a time between when the two images were obtained.

15. The non-transitory program storage device of claim 1, wherein the instructions to cause the one or more programmable control devices to obtain a temporal sequence of images of a scene comprise instructions to cause the one or more programmable control devices to:
   obtain an initial sequence of images, each image having an exposure time; and
   obtain one or more final images after the initial sequence of images is obtained, wherein each of the one or more final images has an exposure time that is shorter than any exposure time of any image in the initial sequence of images.

16. The non-transitory program storage device of claim 15, wherein the instructions to cause the one or more programmable control devices to identify, from the obtained images, a set of relevant images comprise instructions to cause the one or more programmable control devices to:
   determine a first set of relevant images from the initial sequence of images based, at least in part, on the initial sequence of images' quality metric values; and
   determine a second set of relevant images from the one or more final images based, at least in part, on the one or more final images' quality metric values.

17. The non-transitory program storage device of claim 16, wherein the instructions to cause the one or more programmable control devices to determine, for each image in the set of relevant images, a commonality metric value comprise instructions to cause the one or more programmable control devices to:
   determine, for each image in the first set of relevant images, a commonality metric value exclusive of the images in the second set of relevant images; and
   determine, for each image in the second set of relevant images, a commonality metric value exclusive of the images in the first set of relevant images.

18. The non-transitory program storage device of claim 17, wherein the instructions to cause the one or more programmable control devices to identify, from the set of relevant images, a reference image comprise instructions to cause the one or more programmable control devices to:
   identify, from the first set of relevant images, a first reference image based at least in part of the first set of relevant images' commonality metric values; and
   identify, from the second set of relevant images, a second reference image based at least in part of the second set of relevant images' commonality metric values.

19. The non-transitory program storage device of claim 18, wherein the instructions to cause the one or more programmable control devices to combine one or more of the set of relevant images with the reference image to generate an output image of the scene comprise instructions to cause the one or more programmable control devices to:
   combine zero or more images from the first set of relevant images with the first reference image to generate a first intermediate image;
   combine zero or more images from the second set of relevant images with the second reference image to generate a second intermediate image; and
   combine the first and second intermediate images to generate an output image of the scene.

20. A digital image capture device, comprising:
- an imaging sensor;
- a memory communicatively coupled to the imaging sensor;
- a display communicatively coupled to the memory; and
- one or more processors communicatively coupled to the imaging sensor, memory and display and configured to execute instructions stored in the memory to cause the one or more processors to—
  - obtain, from the imaging sensor, a temporal sequence of images of a scene,
  - determine, for each of the obtained images, a quality metric value,
  - identify, from the obtained images, a set of relevant images based at least in part on the obtained images' quality metric values,
  - generate, from the relevant images, a temporary image,
  - determine, for each image in the set of relevant images, a commonality metric value between the each image and the temporary image,
  - identify, from the set of relevant images, a reference image based at least in part on the commonality metric values,
  - combine one or more of the set of relevant images with the reference image to generate an output image of the scene, and
  - store the output image of the scene in the memory.

* * * * *